March 19, 1963 R. STEINECK 3,081,678
PHOTOGRAPHIC CAMERA
Filed Jan. 11, 1960 2 Sheets-Sheet 2

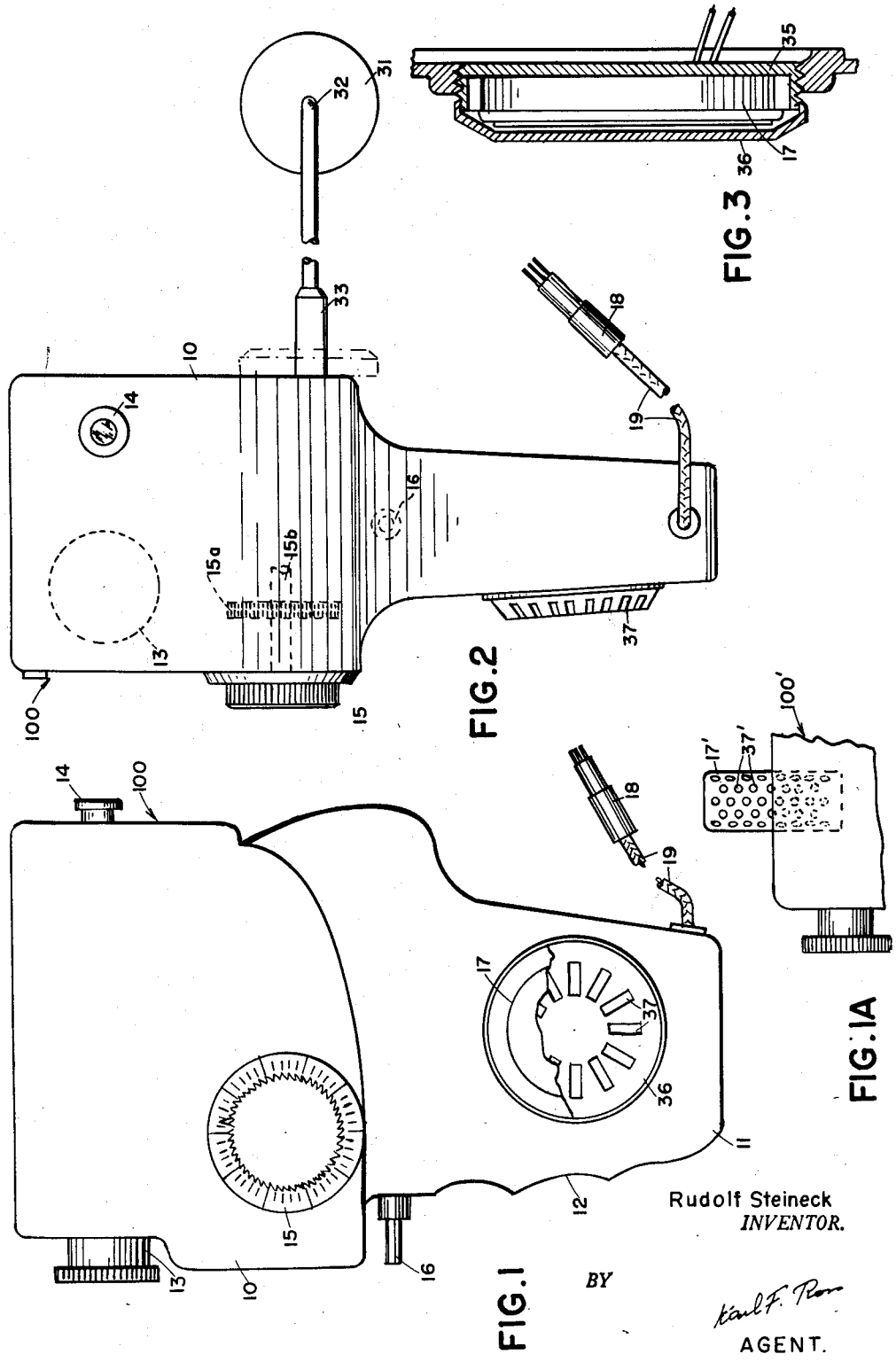

Rudolf Steineck
INVENTOR.

BY
AGENT.

United States Patent Office 3,081,678
Patented Mar. 19, 1963

---

3,081,678
PHOTOGRAPHIC CAMERA
Rudolf Steineck, P.O. Box 22, Lugano-Cassarate,
Switzerland
Filed Jan. 11, 1960, Ser. No. 1,568
2 Claims. (Cl. 95—12)

My present invention relates to photographic cameras.

It is often desirable to add an acoustical dimension to the viewing of photographic slide projections and other still images. Thus, the presentation of such visual displays and particularly the slide projection of still-picture transparencies is frequently provided with accompaniment of music, narration, background noise and/or other sound. This acoustical accompaniment is most conveniently produced by playing back a recorded magnetic track or disc.

It is an object of my present invention to provide an apparatus whereby an acoustical accompaniment for photographs and especially transparencies adapted for slide projection may be recorded substantially at the time of exposure.

It is another object of my invention to provide a photographic camera equipped with means adapted to coordinate the photographing of a succession of images with the concurrent recording of an accompanying sound track.

According to a feature of my invention, I provide a photographic camera having an acoustic pick-up device such as a microphone mounted on its housing, in combination with sound-storing means such as a magnetic tape recorder which may be positioned externally of the camera housing, and switch means coupled with the shutter-trip button of the camera for actuating the sound-recording system during a time immediately prior and subsequent to the taking of a picture. Instead of a single microphone I may provide a pair of such devices for stereophonic pick-up; in this case it will be desirable to mount either or both microphones on laterally movable (e.g. sliding or swinging) supports to provide the necessary spacing for binaural reception.

A more specific feature of the present invention resides in the provision of means for registering on the storage medium (e.g. magnetic tape) of the recording means the operation of the picture-taking mechanism for proper synchronization of visual and acoustic efforts during reproduction, as by picking up the sound of the shutter directly with the microphone or by physically coupling an interrupter contact in its output circuit with a movable member of this mechanism, e.g. the shutter-trip button or the otherwise conventional exposure counter of the camera.

The above and other objects, features and advantages of the present invention will become more readily apparent from the following description, reference being made to the accompanying drawing in which:

FIG. 1 is a side-elevation view of a still-picture camera according to my invention;

FIG. 1a is a fragmentary side-elevational view of a modification of the camera of FIG. 1;

FIG. 2 is a rear-elevational view of the camera of FIG. 1;

FIG. 3 is a cross-sectional view showing a detail of the microphone of the camera of FIG. 1.

Figure 4:
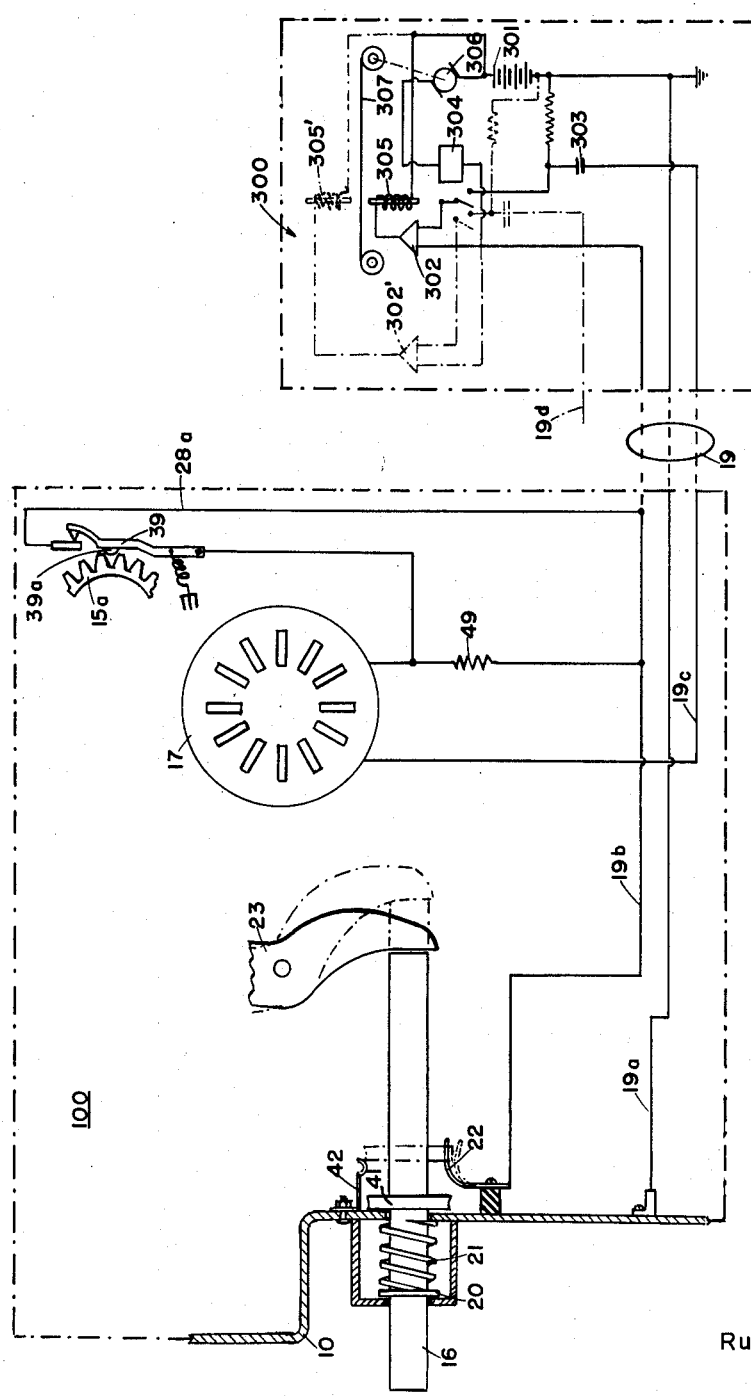
FIG. 4 is a somewhat schematic circuit diagram for the camera of FIG. 1.

In FIG. 1, I show a photographic camera 100 having a housing 10 whose lower portion 11 is formed with a hand-grip 12 generally resembling a pistol grip; the upper part of the housing contains a lens mount 13 and a viewfinder 14 along with conventional shutter and film-transport means not illustrated. The transport mechanism is coupled, in a manner known per se, with a shutter-trip button or trigger 16 of the conventional single-trip type and with an exposure counter 15. A cam disk 15a is carried on the shaft 15b of this counter, as shown in FIG. 2. A microphone 17, e.g. of the capacitive or the crystal type, is mounted in one of the side walls of housing 10. A three-pole plug 18, adapted to be received in a suitable three-pole jack of a sound-recording device 300 (FIG. 4), is connected via a three-wire shielded cable 19 to the camera. The connection between cable 19 and camera 100 may, if desired, include a similar plug-and-jack coupling to enable a detachment of the cable when sound recording is not required.

The operation of the camera 100 will be more readily understood with reference to FIG. 4, wherein I show, schematically, a circuit diagram of the camera and of the recording device 300 connected thereto via shielded cable 19. The delayed-action trigger 16 is provided with a collar 20 bearing upon a restoring spring 21 surrounding its stem whereby a sliding inward displacement of the trigger, to the right as viewed in FIG. 2, will ground a normally open contact spring 22 and trip the shutter of the camera via a lever 23 connected thereto. Grounding of spring 22 occurs in the off-normal position of trigger 16, which is in contact with the at least partly metallic camera housing 10, by means of a collar 41 which engages the spring 22 before the tripping of shutter-release lever 23 and is disengaged from it only when the trigger returns to its normal position shown in solid lines. The same ground is extended through the common return wire 19a to the negative pole of a battery 301 in the preferably portable recorder 300. Contact spring 22 is connected to wire 19b which leads to one of the input terminals of an amplifier 302, which may comprise one or more transistors, in the recorder 300 and, via a normally closed pair of contacts 39, to an input of microphone 17 whose other input is connected to wire 19c and thence, through a condenser 303 and a make contact of a relay 304, to the other input terminal of amplifier 302. Grounding of lead 19b completes the energizing circuit of amplifier 302 from battery 301 through a recording head 305 and also operates the relay 304 in series with a motor 306 for driving the magnetic tape 307 of the recorder 300. Thus, the sounds picked up by microphone 17 are recorded on the tape 307 as long as the contact spring 22 remains engaged by the collar 41 as illustrated in dot-dash lines.

In order to facilitate the recording of sounds for an extended period before the tripping of the shutter-control lever 23, I provide a bent leaf spring 42 which projects inwardly from the wall of camera housing 10 and snaps into a peripheral groove of collar 41 in an intermediate position of trigger 16 in which this collar engages the contact spring 22. This operation occurs, of course, only when the shaft 15b is rotated by the film-transport mechanism as the film is advanced after each actuation of the shutter to align a hitherto unexposed portion of its photo-sensitive surface with the objective 13 of the camera. In this position the trigger may be held by light finger pressure, against the action of the only slightly compressed restoring spring 21, both prior and subsequently to exposure to enable the recording of prefatory or incidental commentary, music and so forth.

Microphone 17, as best seen in FIG. 3, is contained within a cartridge housing 35 threadedly receivable within a recess provided in housing 10; its cover plate 36 is formed with sound-admitting slots 37.

FIG. 2 shows the camera 100 provided in addition with a second microphone 31, carried on a swivel joint 32 at the extremity of a telescoping support bar 33 lodged in the housing 10. Microphone 31, when used as a binaural supplement for microphone 17, can be connected to the amplifier 302' of another recording head 305', operating on a different track of tape 307, via a further wire 19d of cable 19 (or of a separate cable), as well as the leads 19a and 19b, as illustrated in dot-dash lines in FIG. 4. In its extended position, the telescoping support bar 33 provides adequate separation between the microphones 17 and 31 for effective stereophonic reception, while in its retracted position the bar 33 supports microphone 31 against the side wall of housing 10 as shown in dot-dash lines. A similar extendable support may, if desired, also be provided for microphone 17.

The normally closed contacts 39 may be momentarily opened by a tooth of cam disk 15a, engaging a projection 39a on one of these contacts, thereby providing an audible signal upon play-back, to indicate the occurrence of the exposure so that a new slide or picture may be presented to the viewers at the proper time. The audible signal is recorded as a momentary interruption or click in the recording track by the rapid opening and closing of the microphone circuit by contacts 39 which, as shown in FIG. 4, may be bridged by a resistor 49. It will be understood that this signal may be adapted to trigger the slide projector in order to move the next viewing frame into view, or to align the accompanying sound track with the slide-changing operation. A projectionist would need merely to hear the signal to change frames at the correct instant.

The recording of the instant of exposure may also be effected by direct acoustic pick-up of the shutter click. For this purpose it will be desirable to mount the microphone in the vicinity of the camera shutter and to provide it with inwardly directed sound apertures. This has been illustrated in FIG. 1a where a camera 100' has mounted on its top surface a microphone 17', e.g. one of the carbon-granule type, whose cartridge-like casing is provided with apertures 37' both within and without the camera housing. Naturally, such internal sound apertures could also be provided on the microphone 17 of FIGS. 1–4.

It will be readily apparent to persons skilled in the art that the described embodiments may be modified or varied (e.g. by providing a miniature sound recorder in the camera itself) without departing from the spirit and scope of the invention, except as further limited by the accompanying claims.

I claim:
1. In a photographic camera adapted for the taking of still pictures, in combination, sound-recording means including a normally inactive drive for the advance of a recording medium, an objective provided with shutter means, trigger means adapted to trip said shutter means for a single exposure, said trigger means including a member manually displaceable between a normal and a shutter-tripping off-normal position, restoring means tending to maintain said member in its normal position, and contact means operable by said member in an intermediate position for actuating said drive prior to its displacement into said shutter-tripping position and for de-activating said drive subsequently to each exposure and prior to its return to normal by said restoring means.

2. In a photographic camera adapted for the taking of still pictures on a film, in combination, sound-recording means including a normally inactive drive for the advance of a recording medium distinct from said film, an objective provided with shutter means, trigger means adapted to trip said shutter means for a single exposure, mechanism independent of said drive for intermittently advancing said film between exposures, said trigger means including a member manually displaceable between a normal and a shutter-tripping off-normal position, restoring means tending to maintain said member in its normal position, and contact means operable by said member in an intermediate position for actuating said drive prior to its displacement into said shutter-tripping position and for de-activaing said drive subsequently to each exposure and prior to its return to normal by said restoring means.

References Cited in the file of this patent

UNITED STATES PATENTS

| | | |
|---|---|---|
| 1,852,484 | Shumaker | Apr. 5, 1932 |
| 2,322,144 | Hirschbaum | June 15, 1943 |